(12) United States Patent  (10) Patent No.:  US 8,591,376 B1
Shim et al.  (45) Date of Patent:  Nov. 26, 2013

(54) PLANETARY GEAR TRAIN OF AUTOMATIC TRANSMISSION FOR VEHICLE

(71) Applicant: Hyundai Motor Company, Seoul (KR)

(72) Inventors: Hyu Tae Shim, Hwaseong (KR); Kangsoo Seo, Suwon-si (KR)

(73) Assignee: Hyundia Motor Company, Seoul (KR)

( * ) Notice: Subject to any disclaimer, the term of this patent is extended or adjusted under 35 U.S.C. 154(b) by 0 days.

(21) Appl. No.: 13/714,280

(22) Filed: Dec. 13, 2012

(51) Int. Cl.
*F16H 3/62* (2006.01)

(52) U.S. Cl.
USPC .......................................... 475/276; 475/279

(58) Field of Classification Search
USPC .................................. 475/276, 279
See application file for complete search history.

(56) References Cited

U.S. PATENT DOCUMENTS

| | | | |
|---|---|---|---|
| 2010/0160107 A1* | 6/2010 | Rice et al. ...................... | 475/275 |
| 2010/0184556 A1* | 7/2010 | Kim .............................. | 475/276 |
| 2012/0071289 A1 | 3/2012 | Wittkopp et al. | |
| 2012/0178582 A1* | 7/2012 | Wittkopp et al. ............. | 475/276 |

FOREIGN PATENT DOCUMENTS

| | | |
|---|---|---|
| JP | 2006-349153 A | 12/2006 |
| KR | 10-0764717 B1 | 10/2007 |

* cited by examiner

*Primary Examiner* — Edwin A Young
(74) *Attorney, Agent, or Firm* — Morgan, Lewis & Bockius LLP (57) ABSTRACT

A planetary gear train may include an input shaft; an output shaft; a first compound planetary gear set having first and second planetary gear sets, a second compound planetary gear set having third and fourth planetary gear sets to change the rotation speeds input from the first compound planetary gear set and the rotation speed of the input shaft input through one variable input path into eleven forward speeds and one reverse speed and to finally output the eleven forward speeds and the one reverse speed; eight rotation paths having two rotation elements connected to each other or one rotation element among the rotation elements of the first and second compound planetary gear sets; and seven friction members including four clutches interposed between the rotation paths or between a selected rotation path and the input shaft, and three brakes variably connecting a selected rotation path to a transmission housing.

7 Claims, 3 Drawing Sheets

|     | C1 | C2 | C3 | C4 | B1 | B2 | B3 | F1 |
|-----|----|----|----|----|----|----|----|----|
| D1  | ●  |    |    |    | ●  |    | ●  | ○  |
| D2  | ●  |    |    |    |    | ●  | ●  |    |
| D3  | ●  | ●  |    |    |    |    | ●  |    |
| D4  |    | ●  |    |    |    | ●  | ●  |    |
| D5  |    | ●  | ●  |    |    |    | ●  |    |
| D6  |    | ●  | ●  |    |    | ●  |    |    |
| D7  | ●  | ●  | ●  |    |    |    |    |    |
| D8  | ●  |    | ●  |    |    | ●  |    |    |
| D9  | ●  |    | ●  |    | ●  |    |    |    |
| D10 |    |    | ●  |    | ●  | ●  |    |    |
| D11 |    |    | ●  | ●  | ●  |    |    |    |
| REV |    |    |    | ●  | ●  |    | ●  |    |

FIG. 3

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2012-0112464 filed on Oct. 10, 2012, the entire contents of which is incorporated herein for all purposes by this reference.

BACKGROUND OF THE INVENTION

1. Field of the Invention

The present invention relates to an automatic transmission for a vehicle. More particularly, the present invention relates to a planetary gear train of an automatic transmission for vehicles which improves power delivery performance and reduces fuel consumption.

2. Description of Related Art

Typically, a planetary gear train is realized by combining a plurality of planetary gear sets, and the planetary gear train including the plurality of planetary gear sets receives torque from a torque converter and changes and transmits the torque to an output shaft.

It is well known that when a transmission realizes a greater number of shift speeds, speed ratios of the transmission can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear).

In addition, the planetary gear train has different features such a durability, power delivery efficiency, and size depend on the layout thereof. Therefore, designs for a combining structure of a gear train are also under continuous investigation.

Currently, four-speed and five-speed automatic transmissions are most often found on the market. However, six-speed automatic transmissions have also been realized for enhancement of performance of power transmission and for enhanced fuel mileage of a vehicle. In addition, eight-speed automatic transmissions and twelfth-speed automatic transmissions have been developed at a good pace.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of achieving eleven forward speeds and one reverse speed by combining a plurality of planetary gear sets and a plurality of friction members and improving power delivery performance and reducing fuel consumption by operating minimum numbers of planetary gear sets.

A planetary gear train of an automatic transmission for vehicles according to one or more exemplary embodiments of the present invention may include an input shaft adapted to receive engine torque, an output shaft adapted to output changed torque, a first compound planetary gear set having five rotation elements by combining first and second planetary gear sets and adapted to primarily change a rotation speed of the input shaft input through one input path and two variable input paths into six rotation speeds and to output the six rotation speeds, a second compound planetary gear set having four rotation elements including a rotation element directly connected to any one rotation element of the first compound planetary gear set by combining third and fourth planetary gear sets and adapted to secondarily change the rotation speeds input from the first compound planetary gear set and the rotation speed of the input shaft input through one variable input path into eleven forward speeds and one reverse speed and to finally output the eleven forward speeds and the one reverse speed, eight rotation paths having two rotation elements connected to each other or one rotation element among the rotation elements of the first and second compound planetary gear sets, and seven friction members including four clutches interposed between the rotation paths or between a selected rotation path and the input shaft, and three brakes variably connecting a selected rotation path to a transmission housing.

The first compound planetary gear set may be formed by combining the first planetary gear set being a single pinion planetary gear set including a first sun gear, a first planet carrier, and a first ring gear as rotation elements thereof, and the second planetary gear set being a single pinion planetary gear set including a second sun gear, a second planet carrier, and a second ring gear as rotation elements thereof. The second compound planetary gear set may be formed by combining the third planetary gear set being a single pinion planetary gear set including a third sun gear, a third planet carrier, and a third ring gear as rotation elements thereof, and the fourth planetary gear set being a single pinion planetary gear set including a fourth sun gear, a fourth planet carrier, and a fourth ring gear as rotation elements thereof.

The eight rotation paths may include a first rotation path including the first sun gear, and selectively connected to the input shaft or the transmission housing, a second rotation path including the first planet carrier and the second ring gear, and selectively connected to the input shaft or the transmission housing, a third rotation path including the first ring gear and the third and fourth sun gears, a fourth rotation path including the second planet carrier and selectively connected to the third rotation shaft, a fifth rotation path including the second sun gear and directly connected to the input shaft, a sixth rotation path including the third ring gear and selectively connected to the transmission housing, a seventh rotation path including the third planet carrier and the fourth ring gear, and directly connected to the output shaft so as to be operated as a final output element, and an eighth rotation path including the fourth planet carrier and selectively connected to the input shaft.

The seven friction members may include a first clutch variably connecting the third rotation path with the fourth rotation shaft, a second clutch variably connecting the input shaft with the second rotation shaft, a third clutch variably connecting the input shaft with the eighth rotation shaft, a fourth clutch variably connecting the input shaft with the first rotation shaft, a first brake variably connecting the second rotation path with the transmission housing, a second brake variably connecting the first rotation path with the transmission housing, and a third brake variably connecting the sixth rotation path with the transmission housing.

A first forward speed may be achieved by operating the first clutch and the first and third brakes, a second forward speed may be achieved by operating the first clutch and the second and third brakes, a third forward speed may be achieved by operating the first and second clutches and the third brake, a fourth forward speed may be achieved by operating the second clutch and the second and third brakes, a fifth forward speed may be achieved by operating the second and third clutches and the third brake, a sixth forward speed may be achieved by operating the second and third clutches and the second brake, a seventh forward speed may be achieved by operating the first, second, and third clutches, an eighth forward speed may be achieved by operating the first and third clutches and the second brake, a ninth forward speed may be achieved by operating the first and third clutches and the first brake, a tenth forward speed may be achieved by operating the third clutch and the first and second brakes, an eleventh forward speed may be achieved by operating the third and fourth clutches and the first brake, and a reverse speed may be achieved by operating the fourth clutch and the first and third brakes.

A planetary gear train of an automatic transmission for a vehicle according to another exemplary embodiment of the present invention may include an input shaft adapted to receive engine torque, an output shaft adapted to output changed torque, a first compound planetary gear set formed by combining first and second planetary gear sets, each of which is a single pinion planetary gear set, a second compound planetary gear set formed by combining third and fourth planetary gear sets, each of which is a single pinion planetary gear set, and friction members, wherein the first and second compound planetary gear sets may include a first rotation path including a first sun gear, and selectively connected to the input shaft or a transmission housing, a second rotation path including a first planet carrier and a second ring gear, and selectively connected to the input shaft or the transmission housing, a third rotation path including a first ring gear and third and fourth sun gears, a fourth rotation path including a second planet carrier and selectively connected to the third rotation shaft, a fifth rotation path including a second sun gear and directly connected to the input shaft, a sixth rotation path including a third ring gear and selectively connected to the transmission housing, a seventh rotation path including a third planet carrier and a fourth ring gear, and directly connected to the output shaft so as to be operated as a final output element, and an eighth rotation path including a fourth planet carrier and selectively connected to the input shaft, and wherein the friction members may include a first clutch variably connecting the third rotation path with the fourth rotation shaft, a second clutch variably connecting the input shaft with the second rotation shaft, a third clutch variably connecting the input shaft with the eighth rotation shaft, a fourth clutch variably connecting the input shaft with the first rotation shaft, a first brake variably connecting the second rotation path with the transmission housing, a second brake variably connecting the first rotation path with the transmission housing, and a third brake variably connecting the sixth rotation path with the transmission housing.

A first forward speed may be achieved by operating the first clutch and the first and third brakes, a second forward speed may be achieved by operating the first clutch and the second and third brakes, a third forward speed may be achieved by operating the first and second clutches and the third brake, a fourth forward speed may be achieved by operating the second clutch and the second and third brakes, a fifth forward speed may be achieved by operating the second and third clutches and the third brake, a sixth forward speed may be achieved by operating the second and third clutches and the second brake, a seventh forward speed may be achieved by operating the first, second, and third clutches, an eighth forward speed may be achieved by operating the first and third clutches and the second brake, a ninth forward speed may be achieved by operating the first and third clutches and the first brake, a tenth forward speed may be achieved by operating the third clutch and the first and second brakes, an eleventh forward speed may be achieved by operating the third and fourth clutches and the first brake, and a reverse speed may be achieved by operating the fourth clutch and the first and third brakes.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

Figure 1:
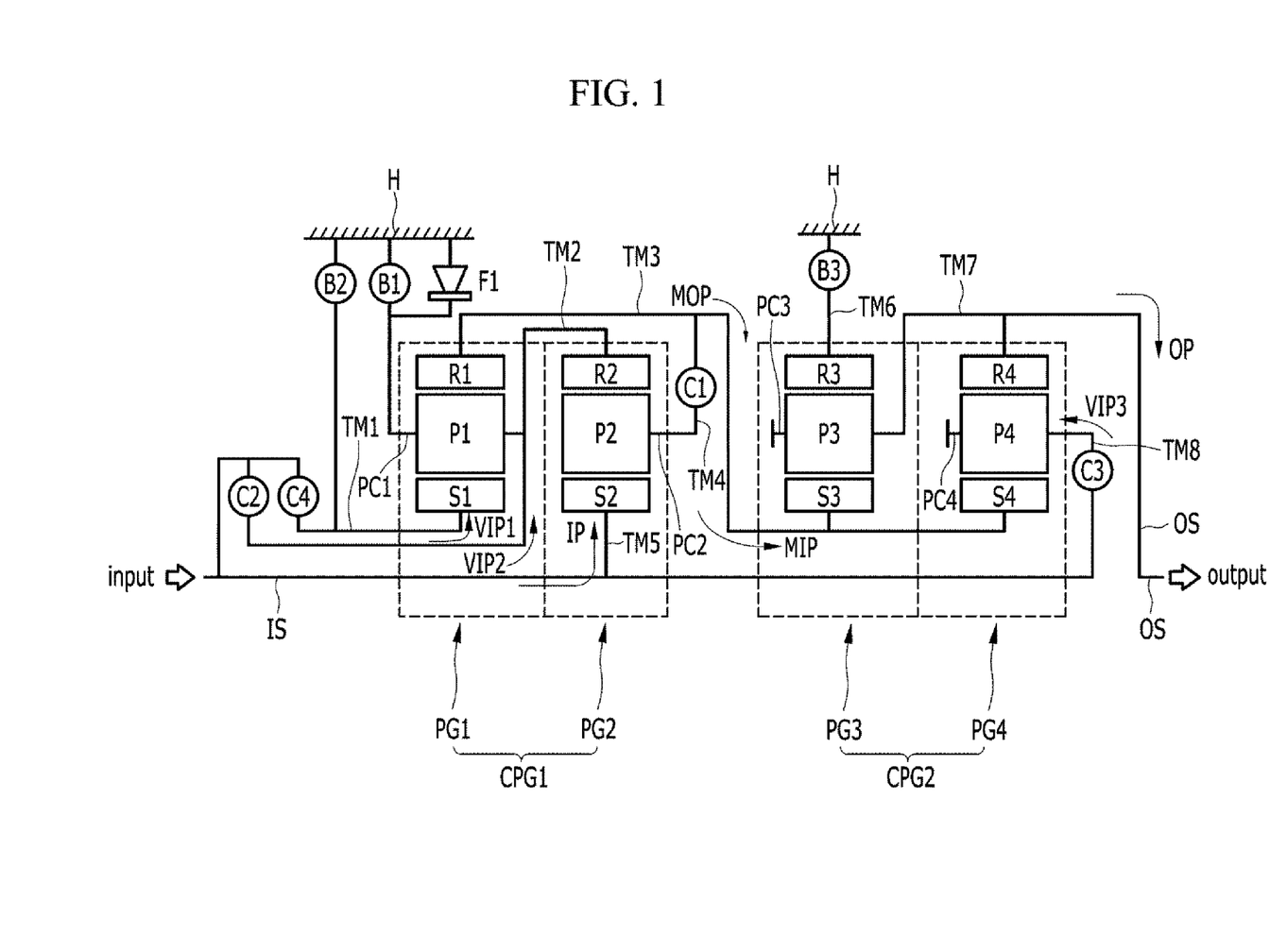
FIG. 1 is a schematic diagram of a planetary gear train according to an exemplary embodiment of the present invention.

FIG. 1 is a schematic diagram of a planetary gear train according to an exemplary embodiment of the present invention.

Referring to FIG. 1, a planetary gear train according to an exemplary embodiment of the present invention includes first, second, third, and fourth planetary gear sets PG1, PG2, PG3, and PG4 disposed on the same axis, an input shaft IS, an output shaft OS, eight rotation paths TM1-TM8 connecting rotation elements of the first, second, third, and fourth planetary gear sets PG1, PG2, PG3, and PG4, seven friction members C1-C4 and B1-B3, and a transmission housing H.

A rotation speed input from the input shaft IS is changed by the first, second, third, and fourth planetary gear sets PG1, PG2, PG3, and PG4 and is output through the output shaft OS.

In addition, the simple planetary gear sets are disposed in a sequence of the first, second, third, and fourth planetary gear sets PG1, PG2, PG3, and PG4 from the rear to an engine.

The input shaft IS is an input member, and torque from a crankshaft of the engine is changed through a torque converter and is input to the input shaft IS.

The output shaft OS is an output member and delivers driving torque so as to run driving wheels through a differential apparatus.

The first planetary gear set PG1 is a single pinion planetary gear set, and includes a first sun gear S1, a first planet carrier PC1 rotatably supporting a first pinion P1 externally meshed with the first sun gear S1, a first ring gear R1 internally meshed with the first pinion P1 as rotation elements thereof.

The second planetary gear set PG2 is a single pinion planetary gear set, and includes a second sun gear S2, a second planet carrier PC2 rotatably supporting a second pinion P2 externally meshed with the second sun gear S2, a second ring gear R2 internally meshed with the second pinion P2 as rotation elements thereof.

The third planetary gear set PG3 is a single pinion planetary gear set, and includes a third sun gear S3, a third planet carrier PC3 rotatably supporting a third pinion P3 externally meshed with the third sun gear S3, a third ring gear R3 internally meshed with the third pinion P3 as rotation elements thereof.

The fourth planetary gear set PG4 is a single pinion planetary gear set, and includes a fourth sun gear S4, a fourth planet carrier PC4 rotatably supporting a fourth pinion P4 externally meshed with the fourth sun gear S4, a fourth ring gear R4 internally meshed with the fourth pinion P4 as rotation elements thereof.

In addition, the first, second, third, and fourth simple planetary gear sets PG1, PG2, PG3, and PG4 form two compound planetary gear sets CPG1 and CPG2, change the torque transmitted from the input shaft into eleven forward speeds, and output the eleven forward speeds.

The first compound planetary gear set CPG1 includes the first and second planetary gear sets PG1 and PG2, and the second compound planetary gear set CPG2 includes the third and fourth planetary gear sets PG3 and PG4.

The first compound planetary gear set CPG1 is operated by five rotation elements by directly connecting the first planet carrier PC1 with the second ring gear R2.

The second compound planetary gear set CPG2 is operated by four rotation elements by directly connecting the third sun gear S3 with the fourth sun gear S4 and directly connecting the third planet carrier PC3 with the fourth ring gear R4.

In addition, any one rotation element of the first compound planetary gear set CPG1 is directly connected to any one rotation element of the second compound planetary gear set CPG2 such that the eight rotation paths TM1-TM8 are formed.

A first rotation path TM1 includes the first sun gear S1, and is selectively connected to the input shaft IS or the transmission housing H.

A second rotation path TM2 includes the first planet carrier PC1 and the second ring gear R2, and is selectively connected to the input shaft IS or the transmission housing H.

A third rotation path TM3 includes the first ring gear R1 and the third and fourth sun gears S3 and S4.

A fourth rotation path TM4 includes the second planet carrier PC2 and is selectively connected to the third rotation path TM3.

A fifth rotation path TM5 includes the second sun gear S2 and is directly connected to the input shaft IS.

A sixth rotation path TM6 includes the third ring gear R3 and is selectively connected to the transmission housing H.

A seventh rotation path TM7 includes the third planet carrier PC3 and the fourth ring gear R4, and is directly connected to the output shaft OS.

An eighth rotation path TM8 includes the fourth planet carrier PC4 and is selectively connected to the input shaft IS.

In addition, four clutches C1, C2, C3, and C4 of the friction members are disposed at positions where the rotation paths TM1-TM8 are selectively connected to the input shaft IS or another rotation shaft.

In addition, three brakes B1, B2, and B3 of the friction members are disposed at positions where the rotation paths TM1-TM8 are selectively connected to the transmission housing H.

A first clutch C1 is interposed between the third rotation path TM3 and the fourth rotation path TM4 and selectively connects the third and fourth rotation paths TM3 and TM4.

A second clutch C2 is interposed between the input shaft IS and the second rotation path TM2 such that the second rotation path TM2 is operated as a selective input element.

A third clutch C3 is interposed between the input shaft IS and the eighth rotation path TM8 such that the eighth rotation path TM8 is operated as a selective input element.

A fourth clutch C4 is interposed between the input shaft IS and the first rotation path TM1 such that the first rotation path TM1 is operated as a selective input element.

A first brake B1 is interposed between the second rotation path TM2 and the transmission housing H such that the second rotation path TM2 is operated as a selective fixed element.

A second brake B2 is interposed between the first rotation path TM1 and the transmission housing H such that the first rotation path TM1 is operated as a selective fixed element.

A third brake B3 is interposed between the sixth rotation path TM6 and the transmission housing H such that the sixth rotation path TM6 is operated as a selective fixed element.

In addition, a one-way clutch F1, in parallel with the first brake B1, may be disposed between the second rotation path TM2 and the transmission housing H.

The first, second, and fourth clutch C1, C2, and C4 and the first and second brake B1 and B2 are applied to the first compound planetary gear set CPG1.

Therefore, the first compound planetary gear set CPG1 changes the rotation speed of the input shaft IS input through one input path IP and first and second variable input paths VIP1 and VIP2 into six rotation speeds by operation of the first and second brakes B1 and B2 and the first clutch C1, and transmits the six rotation speeds to the second compound planetary gear set CPG2 through one intermediate output path MOP.

At this time, the six rotation speeds include two reduced rotation speeds, one fixed rotation speed (rotation speed is 0), one unchanged rotation speed (the same rotation speed as the input shaft IS), one increased rotation speed, and one inverse rotation speed.

In addition, the third clutch C3 and the third brake B3 are applied to the second compound planetary gear set CPG2.

Therefore, the second compound planetary gear set CPG2 changes the rotation speeds input through an intermediate input path MIP and a third variable input path VIP3 into eleven forward speeds and one reverse speed by operation of the third brake B3, and outputs the eleven forward speeds and the one reverse speed through a final output path OP.

Friction member including the first, second, third, and fourth clutches C1, C2, C3, and C4 and the first, second, and third brakes B1, B2, and B3 are conventional multi-plate friction elements of wet type that are operated by hydraulic pressure.

Figure 2:
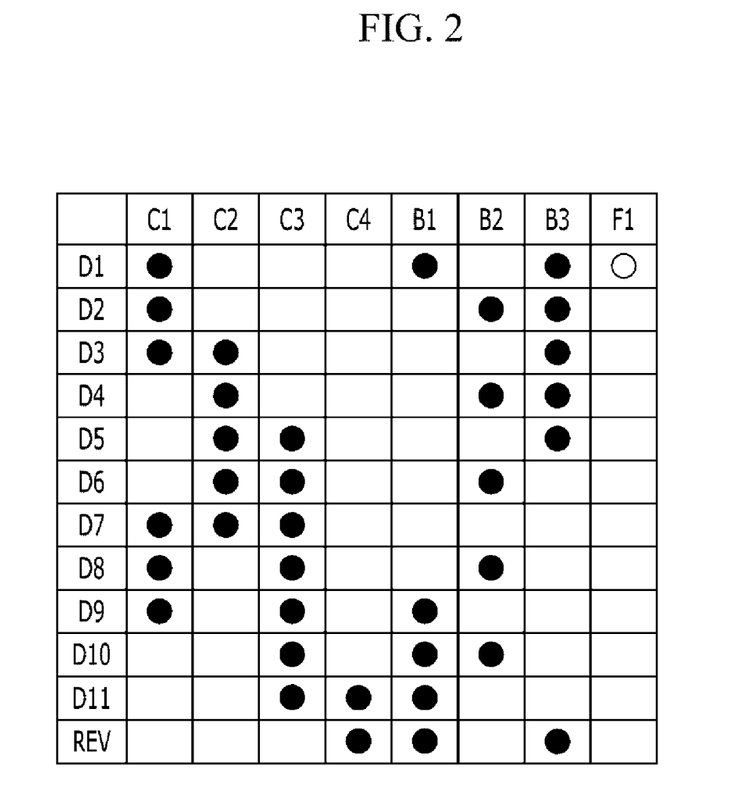
FIG. 2 is an operational chart of friction members at each shift-speed applied to a planetary gear train according to an exemplary embodiment of the present invention.

FIG. 2 is an operational chart of friction members at each shift-speed applied to a planetary gear train according to an exemplary embodiment of the present invention.

As shown in FIG. 2, three friction members are operated at each shift-speed according to an exemplary embodiment of the present invention.

A first forward speed D1 is achieved by operating the first clutch C1, the first brake B1, and the third brake B3.

A second forward speed D2 is achieved by operating the first clutch C1, the second brake B2, and the third brake B3.

A third forward speed D3 is achieved by operating the first clutch C1, the second clutch C2, and the third brake B3.

A fourth forward speed D4 is achieved by operating the second clutch C2, the second brake B2, and the third brake B3.

A fifth forward speed D5 is achieved by operating the second clutch C2, the third clutch C3, and the third brake B3.

A sixth forward speed D6 is achieved by operating the second clutch C2, the third clutch C3, and the second brake B2.

A seventh forward speed D7 is achieved by operating the first clutch C1, the second clutch C2, and the third clutch C3.

An eighth forward speed D8 is achieved by operating the first clutch C1, the third clutch C3, and the second brake B2.

A ninth forward speed D9 is achieved by operating the first clutch C1, the third clutch C3, and the first brake B1.

A tenth forward speed D10 is achieved by operating the third clutch C3, the first brake B1, and the second brake B2.

An eleventh forward speed D11 is achieved by operating the third clutch C3, the fourth clutch C4, and the first brake B1.

A reverse speed REV is achieved by operating the fourth clutch C4, the first brake B1, and the third brake B3.

Although it is explained that the first clutch C1 and the first and third brakes B1 and B3 are operated at the first forward speed D1, the one-way clutch F1 instead of the first brake B1 may be operated at a normal driving condition.

Figure 3:
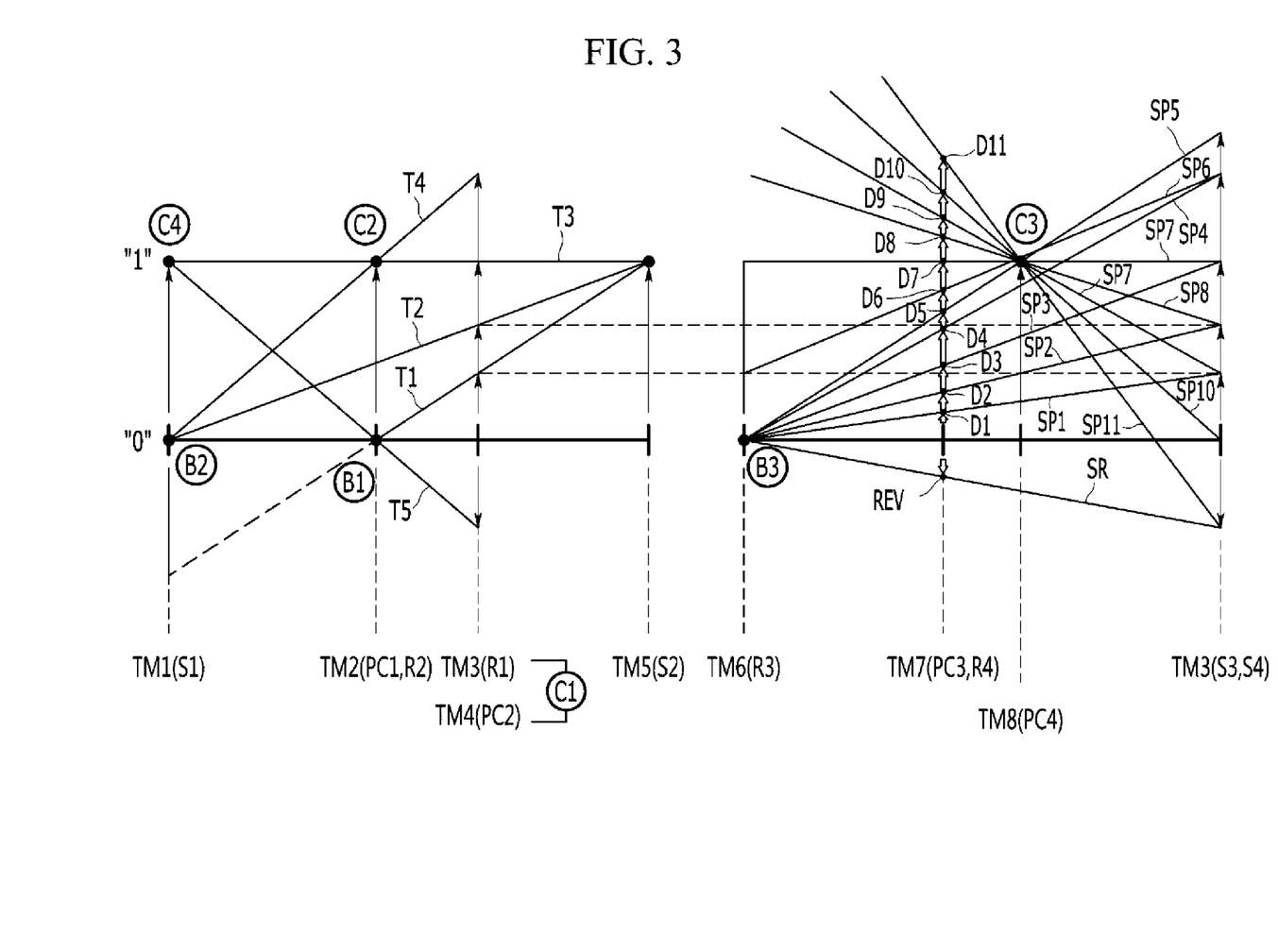
FIG. 3 is a lever diagram for a planetary gear train according to an exemplary embodiment of the present invention.

FIG. 3 is a lever diagram for a planetary gear train according to an exemplary embodiment of the present invention. In FIG. 3, shifting processes of the planetary gear train according to an exemplary embodiment of the present invention are illustrated through lever analysis method.

Referring to FIG. 3, a lower horizontal line represents a rotation speed is "0", and an upper horizontal line represents a rotation speed is "1.0", that is the rotation speed thereof is the same as that of the input shaft IS.

Four vertical lines of the first compound planetary gear set CPG1 sequentially represent the first rotation path TM1, the second rotation path TM2, the third rotation path TM3 or the fourth rotation path TM4, and the fifth rotation path TM5 from the left to the right.

Herein, distances between the first rotation path TM1, the second rotation path TM2, the third rotation path TM3 or the fourth rotation path TM4, and the fifth rotation path TM5 are set according to gear ratios (teeth number of the sun gear/teeth number of the ring gear) of the first and second planetary gear sets PG1 and PG2.

Since the third rotation path TM3 and the fourth rotation path TM4 are operated as one rotation path when the first clutch C1 is operated, the third rotation path TM3 and the fourth rotation path TM4 are disposed on one vertical line.

Four vertical lines of the second compound planetary gear set CPG2 sequentially represent the sixth rotation path TM6, the seventh rotation path TM7, the eighth rotation path TM8, and the third rotation path TM3 from the left to the right.

Herein, distances between the sixth, seventh, eighth, and third rotation paths TM6, TM7, TM8, and TM3 are set according to gear ratios (teeth number of the sun gear/teeth number of the ring gear) of the third and fourth planetary gear sets PG3 and PG4.

Hereinafter, referring to FIG. 2 and FIG. 3, shifting processes for each shift-speed in the planetary gear train according to an exemplary embodiment of the present invention will be described.

[First Forward Speed]

Referring to FIG. 2, the first clutch C1 and the first and third brakes B1 and B3 are operated at the first forward speed D1.

As shown in FIG. 3, in a state that the rotation speed of the input shaft IS is input to the fifth rotation path TM5 of the first compound planetary gear set CPG1, the second rotation path TM2 is operated as a fixed element by operation of the first brake B1.

Therefore, the rotation paths of the first compound planetary gear set CPG1 form a first reduced speed line T1, and output a first reduced rotation speed through the third rotation path TM3.

In a state that the first reduced rotation speed of the third rotation path TM3 is input to the second compound planetary gear set CPG2, the sixth rotation path TM6 is operated as a fixed element by operation of the third brake B3. Therefore, the rotation paths of the second compound planetary gear set CPG2 form a first shift line SP1.

Therefore, the first shift line SP1 crosses the vertical line of the seventh rotation path TM7 that is an output element such that the first forward speed D1 is output.

In addition, the first forward speed D1 is output by operation of the second and third planetary gear sets PG2 and PG3.

[Second Forward Speed]

The first brake B1 that was operated at the first forward speed D1 is released and the second brake B2 is operated at the second forward speed D2.

As shown in FIG. 3, in a state that the rotation speed of the input shaft IS is input to the fifth rotation path TM5 of the first compound planetary gear set CPG1, the first rotation path TM1 is operated as a fixed element by operation of the second brake B2.

Therefore, the rotation paths of the first compound planetary gear set CPG1 form a second reduced speed line T2 and output a second reduced rotation speed through the third rotation path TM3.

In a state that the second reduced rotation speed of the third rotation path TM3 is input to the second compound planetary gear set CPG2, the sixth rotation path TM6 is operated as a fixed element by operation of the third brake B3. Therefore, the rotation paths of the second compound planetary gear set CPG2 form a second shift line SP2.

Therefore, the second shift line SP2 crosses the vertical line of the seventh rotation path TM7 that is the output element such that the second forward speed D2 is output.

In addition, the second forward speed D2 is output by operation of the second, third, and fourth planetary gear sets PG2, PG3, and PG4.

[Third Forward Speed]

The second brake B2 that was operated at the second forward speed D2 is released and the second clutch C2 is operated at the third forward speed D3.

In a state that the rotation speed of the input shaft IS is input to the fifth rotation path TM5 of the first compound planetary gear set CPG1, the rotation speed of the input shaft IS is also input to the second rotation path TM2 by operation of the second clutch C2. Therefore, the first compound planetary gear set CPG1 becomes a direct-coupling state, and the rotation paths of the first compound planetary gear set CPG1 form a direct-coupling speed line T3 so as to output the same rotation speed as the input shaft IS through the third rotation path TM3.

In a state that the same rotation speed as the input shaft IS is input to the second compound planetary gear set CPG2 through the third rotation path TM3, the sixth rotation path TM6 is operated as a fixed element by operation of the third brake B3. Therefore, the rotation paths of the second compound planetary gear set CPG2 form a third shift line SP3.

Therefore, the third shift line SP3 crosses the vertical line of the seventh rotation path TM7 that is the output element such that the third forward speed D3 is output.

In addition, the third forward speed D3 is output by operation of the third planetary gear set PG3.

[Fourth Forward Speed]

The first clutch C1 that was operated at the third forward speed D3 is released and the second brake B2 is operated at the fourth forward speed D4.

In a state that the rotation speed of the input shaft IS is input to the fifth rotation path TM5 of the first compound planetary gear set CPG1, the rotation speed of the input shaft IS is input to the second rotation path TM2 by operation of the second clutch C2.

However, the rotation speed of the input shaft IS is input to the second rotation path TM2 in a state that the first clutch C1 is released and the first rotation path TM1 is operated as a fixed element by operation of the second brake B2. Therefore, the rotation paths of the first compound planetary gear set CPG1 form an increased speed line T4 an output an increased rotation speed through the third rotation path TM3.

In a state that the increased rotation speed is input to the second compound planetary gear set CPG2 through the third rotation path TM3, the sixth rotation path TM6 is operated as a fixed element by operation of the third brake B3. Therefore, the rotation paths of the second compound planetary gear set CPG2 form a fourth shift line SP4.

Therefore, the fourth shift line SP4 crosses the vertical line of the seventh rotation path TM7 that is the output element such that the fourth forward speed D4 is output.

In addition, the fourth forward speed D4 is output by operation of the first and third planetary gear sets PG1 and PG3.

[Fifth Forward Speed]

The second brake B2 that was operated at the fourth forward speed D4 is released and the third clutch C3 is operated at the fifth forward speed D5.

In a state that the rotation speed of the input shaft IS is input to the fifth rotation path TM5 of the first compound planetary gear set CPG1, the rotation speed of the input shaft IS is also input to the second rotation path TM2 by operation of the second clutch C2.

However, since related friction members such as the first and second brakes B1 and B2 are not operated, the first compound planetary gear set CPG1 does not have any effect on shifting.

In a state that the rotation speed of the input shaft IS is input to the eighth rotation path TM8 by operation of the third clutch C3, the sixth rotation path TM6 is operated as a fixed element by operation of the third brake B3 in the second compound planetary gear set CPG2. Therefore, the rotation paths of the second compound planetary gear set CPG2 form a fifth shift line SP5.

Therefore, the fifth shift line SP5 crosses the vertical line of the seventh rotation path TM7 that is the output element such that the fifth forward speed D5 is output.

In addition, the fifth forward speed D5 is output by operation of the third and fourth planetary gear sets PG3 and PG4.

[Sixth Forward Speed]

The third brake B3 that was operated at the fifth forward speed D5 is released and the second brake B2 is operated at the sixth forward speed D6.

In a state that the rotation speed of the input shaft IS is input to the fifth rotation path TM5 of the first compound planetary gear set CPG1, the rotation speed of the input shaft IS is also input to the second rotation path TM2 by operation of the second clutch C2.

Since the rotation speed of the input shaft IS is input to the second rotation path TM2 and the first rotation path TM1 is operated as a fixed element by operation of the second brake B2 in a state that the first clutch C1 is released, the rotation paths of the first compound planetary gear set CPG1 form the increased speed line T4 and output the increased rotation speed through the third rotation path TM3.

In a state that the increased rotation speed is input to the second compound planetary gear set CPG2 through the third rotation path TM3, the rotation speed of the input shaft IS is input to the eighth rotation path TM8 by operation of the third clutch C3. Therefore, the rotation paths of the second compound planetary gear set CPG2 form a sixth shift line SP6.

Therefore, the sixth shift line SP6 crosses the vertical line of the seventh rotation path TM7 that is the output element such that the sixth forward speed D6 is output.

In addition, the sixth forward speed D6 is output by operation of the first and fourth planetary gear sets PG1 and PG4.

[Seventh Forward Speed]

The second brake B that was operated at the sixth forward speed D6 is released and the first clutch C1 is operated at the seventh forward speed D7.

In a state that the rotation speed of the input shaft IS is input to the fifth rotation path TM5 of the first compound planetary gear set CPG1, the rotation speed of the input shaft IS is input to the second rotation path TM2 by operation of the second clutch C2. Therefore, the first compound planetary gear set CPG1 becomes the direct-coupling state and the rotation paths of the first compound planetary gear set CPG1 form the direct-coupling speed line T3 so as to output the same rotation speed as the input shaft IS through the third rotation path TM3.

In a state that the same rotation speed as the input shaft IS is input to the second compound planetary gear set CPG2 through the third rotation path TM3, the rotation speed of the input shaft IS is input to the eighth rotation path TM8 by operation of the third clutch C3. Therefore, the second compound planetary gear set CPG2 becomes the direct-coupling state and the rotation paths of the second compound planetary gear set CPG2 form a seventh shift line SP7 such that the seventh forward speed D7 that is the same rotation speed as the input shaft IS is output.

In addition, the first and second compound planetary gear sets CPG1 and CPG2 transmits a rotation speed of the engine to the output shaft OS at the seventh forward speed D7.

[Eighth Forward Speed]

The second clutch C2 that was operated at the seventh forward speed D7 is released and the second brake B2 is operated at the eighth forward speed D8.

As shown in FIG. 3, in a state that the rotation speed of the input shaft IS is input to the fifth rotation path TM5 of the first compound planetary gear set CPG1, the first rotation path TM1 is operated as a fixed element by operation of the second brake B2.

Therefore, the rotation paths of the first compound planetary gear set CPG1 form the second reduced speed line T2 and output the second reduced rotation speed through the third rotation path TM3.

In a state that the second reduced rotation speed is input through the third rotation path TM3, the rotation speed of the input shaft IS is input to the eighth rotation path TM8 by operation of the third clutch C3. Therefore, the rotation paths of the second compound planetary gear set CPG2 form an eighth shift line SP8.

Therefore, the eighth shift line SP8 crosses the vertical line of the seventh rotation path TM7 that is the output element such that the eighth forward speed D8 is output.

In addition, the eighth forward speed D8 is output by operation of the first, second, and fourth planetary gear sets PG1, PG2, and PG4.

[Ninth Forward Speed]

The second brake B2 that was operated at the eighth forward speed D8 is released and the first brake B1 is operated at the ninth forward speed D9.

As shown in FIG. 3, in a state that the rotation speed of the input shaft IS is input to the fifth rotation path TM5 of the first compound planetary gear set CPG1, the second rotation path TM2 is operated as a fixed element by operation of the first brake B1.

Therefore, the rotation paths of the first compound planetary gear set CPG1 form the first reduced speed line T1 and output the first reduced rotation speed through the third rotation path TM3.

In a state that the first reduced rotation speed is input through the third rotation path TM3, the rotation speed of the input shaft IS is input to the eighth rotation path TM8 by operation of the third clutch C3. Therefore, the rotation paths of the second compound planetary gear set CPG2 form a ninth shift line SP9.

Therefore, the ninth shift line SP9 crosses the vertical line of the seventh rotation path TM7 that is the output element such that the ninth forward speed D9 is output.

In addition, the ninth forward speed D9 is output by operation of the second and fourth planetary gear sets PG2 and PG4.

[Tenth Forward Speed]

The first clutch C1 that was operated at the ninth forward speed D9 is released and the second brake B2 is operated at the tenth forward speed D10.

In a case that the rotation speed of the input shaft IS is input to the fifth rotation path TM5 of the first compound planetary gear set CPG1, the third rotation path TM3 is fixed by operation of the first and second brakes B1 and B2.

In a state that the rotation speed of the input shaft IS is input to the eighth rotation path TM8, the third rotation path TM3 is fixed. Therefore, the rotation paths of the second compound planetary gear set CPG2 form a tenth shift line SP10.

Therefore, the tenth shift line SP10 crosses the vertical line of the seventh rotation path TM7 that is the output element such that the tenth forward speed D10 is output.

In addition, the tenth forward speed D10 is output by operation of the fourth planetary gear set PG4.

[Eleventh Forward Speed]

The second brake B2 that was operated at the tenth forward speed D10 is released and the fourth clutch C4 is operated at the eleventh forward speed D11.

As shown in FIG. 3, although the rotation speed of the input shaft IS is input to the fifth rotation path TM5 of the first compound planetary gear set CPG1, it does not any effect on shifting.

In a state that the rotation speed of the input shaft IS is input to the first rotation path TM1 by operation of the fourth clutch C4, the rotation paths of the first compound planetary gear set CPG1 form an inverse speed line T5 by operation of the first brake B1. Therefore, an inverse rotation speed is output through the third rotation path TM3.

In a state that, the inverse rotation speed is input through the third rotation path TM3, the rotation speed of the input shaft IS is input to the eighth rotation path TM8 by operation of the third clutch C3. Therefore, the rotation paths of the second compound planetary gear set CPG2 form an eleventh shift line SP11.

Therefore, the eleventh shift line SP11 crosses the vertical line of the seventh rotation path TM7 that is the output element such that the eleventh forward speed D11 is output.

In addition, the eleventh forward speed D11 is output by operation of the first and fourth planetary gear sets PG1 and PG4.

[Reverse Speed]

The fourth clutch C4 and the first and third brakes B1 and B3 are operated at the reverse speed REV.

As shown in FIG. 3, although the rotation speed of the input shaft IS is input to the fifth rotation path TM5 of the first compound planetary gear set CPG1, it does not have any effect on shifting.

In a state that the rotation speed of the input shaft IS is input to the first rotation path TM1 by operation of the fourth clutch C4, the rotation paths of the first compound planetary gear set CPG1 form the inverse speed line T5 by operation of the first brake B1. Therefore, the inverse rotation speed is output through the third rotation path TM3.

In a state that the inverse rotation speed is input through the third rotation path TM3, the sixth rotation path TM6 is operated as a fixed element by operation of the third brake B3. Therefore, the rotation paths of the second compound planetary gear set CPG2 form a reverse shift line SR.

Therefore, the reverse shift line SR crosses the vertical line of the seventh rotation path TM7 that is the output element such that the reverse speed REV is output.

In addition, the reverse speed REV is output by operation of the first and third planetary gear sets PG1 and PG3.

According to an exemplary embodiment of the present invention, since four planetary gear sets PG1, PG2, PG3, and PG4 are combined to two compound planetary gear sets CPG1 and CPG2 and are controlled by four clutches C1, C2, C3, and C4 and three brakes B1, B2, and B3, eleven forward speeds and one reverse speed may be achieved.

Therefore, the planetary gear train according to an exemplary embodiment of the present invention may improve power delivery efficiency and reduce fuel consumption by achieving multi shift-speeds of the automatic transmission.

Since three friction members are operated at each shift-speed, the number of the friction members that are not operated can be minimized and friction drag loss may be reduced. Therefore, power delivery efficiency and fuel economy may be further improved.

In addition, the number of planetary gear sets that are operated differ at each shift-speed in the planetary gear train according to an exemplary embodiment of the present invention.

That is, the first forward speed D1 is achieved by operating the second and third planetary gear sets PG2 and PG3, the second forward speed D2 is achieved by operating the first, second, and third planetary gear sets PG1, PG2, and PG3, the third forward speed D3 is achieved by operating the third planetary gear set PG3, the fourth forward speed D4 is achieved by operating the first and third planetary gear sets PG1 and PG3, the fifth forward speed D5 is achieved by operating the third and fourth planetary gear sets PG3 and PG4, the sixth forward speed D6 is achieved by operating the first and fourth planetary gear sets PG1 and PG4, the seventh forward speed D7 is achieved by operating the first, second, third, and fourth planetary gear sets PG1, PG2, PG3, and PG4, the eighth forward speed D8 is achieved by operating the first, second, and fourth planetary gear sets PG1, PG2, and PG4, the ninth forward speed D9 is achieved by operating the second and fourth planetary gear sets PG2 and PG4, the tenth forward speed D10 is achieved by operating the fourth planetary gear set PG4, the eleventh forward speed D11 is achieved by operating the first and fourth planetary gear sets PG1 and PG4, and the reverse speed REV is achieved by operating the first and third planetary gear sets PG1 and PG3.

That is, the number of planetary gear sets that are operated at each shift-speed is minimized and power loss may be minimized.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   an input shaft adapted to receive engine torque;
   an output shaft adapted to output changed torque;
   a first compound planetary gear set having five rotation elements by combining first and second planetary gear sets and adapted to change a rotation speed of the input shaft input through one input path and two variable input paths into six rotation speeds and to output the six rotation speeds;
   a second compound planetary gear set having four rotation elements including a rotation element directly connected to any one rotation element of the first compound planetary gear set by combining third and fourth planetary gear sets and adapted to change the rotation speeds input from the first compound planetary gear set and the rotation speed of the input shaft input through one variable input path into eleven forward speeds and one reverse speed and to finally output eleven forward speeds and one reverse speed;
   eight rotation paths having two rotation elements connected to each other or one rotation element among the rotation elements of the first and second compound planetary gear sets; and
   seven friction members including four clutches interposed between the rotation paths or between a selected rotation path and the input shaft, and three brakes variably connecting a selected rotation path to a transmission housing.

2. The planetary gear train of claim 1,
   wherein the first compound planetary gear set is formed by combining the first planetary gear set which is a single pinion planetary gear set including a first sun gear, a first planet carrier, and a first ring gear as rotation elements thereof, and the second planetary gear set which is a single pinion planetary gear set including a second sun gear, a second planet carrier, and a second ring gear as rotation elements thereof, and
   wherein the second compound planetary gear set is formed by combining the third planetary gear set which is a single pinion planetary gear set including a third sun gear, a third planet carrier, and a third ring gear as rotation elements thereof, and the fourth planetary gear set which is a single pinion planetary gear set including a fourth sun gear, a fourth planet carrier, and a fourth ring gear as rotation elements thereof.

3. The planetary gear train of claim 2, wherein the eight rotation paths include:
   a first rotation path including the first sun gear, and selectively connected to the input shaft or the transmission housing;
   a second rotation path including the first planet carrier and the second ring gear, and selectively connected to the input shaft or the transmission housing;
   a third rotation path including the first ring gear and the third and fourth sun gears;
   a fourth rotation path including the second planet carrier and selectively connected to the third rotation path;
   a fifth rotation path including the second sun gear and directly connected to the input shaft;
   a sixth rotation path including the third ring gear and selectively connected to the transmission housing;
   a seventh rotation path including the third planet carrier and the fourth ring gear, and directly connected to the output shaft so as to be operated as a final output element; and
   an eighth rotation path including the fourth planet carrier and selectively connected to the input shaft.

4. The planetary gear train of claim 3, wherein the seven friction members include:
   a first clutch selectively connecting the third rotation path with the fourth rotation path;
   a second clutch selectively connecting the input shaft with the second rotation path;
   a third clutch selectively connecting the input shaft with the eighth rotation path;
   a fourth clutch selectively connecting the input shaft with the first rotation path;
   a first brake selectively connecting the second rotation path with the transmission housing;
   a second brake selectively connecting the first rotation path with the transmission housing; and a third brake selectively connecting the sixth rotation path with the transmission housing.

5. The planetary gear train of claim 4,
wherein a first forward speed is achieved by operating the first clutch and the first and third brakes,
wherein a second forward speed is achieved by operating the first clutch and the second and third brakes,
wherein a third forward speed is achieved by operating the first and second clutches and the third brake,
wherein a fourth forward speed is achieved by operating the second clutch and the second and third brakes,
wherein a fifth forward speed is achieved by operating the second and third clutches and the third brake,
wherein a sixth forward speed is achieved by operating the second and third clutches and the second brake,
wherein a seventh forward speed is achieved by operating the first, second, and third clutches,
wherein an eighth forward speed is achieved by operating the first and third clutches and the second brake,
wherein a ninth forward speed is achieved by operating the first and third clutches and the first brake,
wherein a tenth forward speed is achieved by operating the third clutch and the first and second brakes,
wherein an eleventh forward speed is achieved by operating the third and fourth clutches and the first brake, and
wherein a reverse speed is achieved by operating the fourth clutch and the first and third brakes.

6. A planetary gear train of an automatic transmission for a vehicle, comprising:
an input shaft adapted to receive engine torque;
an output shaft adapted to output changed torque;
a first compound planetary gear set formed by combining first and second planetary gear sets, each of which is a single pinion planetary gear set;
a second compound planetary gear set formed by combining third and fourth planetary gear sets, each of which is a single pinion planetary gear set; and
friction members,
wherein the first and second compound planetary gear sets include
a first rotation path including a first sun gear, and selectively connected to the input shaft or a transmission housing,
a second rotation path including a first planet carrier and a second ring gear, and selectively connected to the input shaft or the transmission housing,
a third rotation path including a first ring gear and third and fourth sun gears,
a fourth rotation path including a second planet carrier and selectively connected to the third rotation path,
a fifth rotation path including a second sun gear and directly connected to the input shaft,
a sixth rotation path including a third ring gear and selectively connected to the transmission housing,
a seventh rotation path including a third planet carrier and a fourth ring gear, and directly connected to the output shaft so as to be operated as a final output element, and
an eighth rotation path including a fourth planet carrier and selectively connected to the input shaft, and
wherein the friction members include
a first clutch selectively connecting the third rotation path with the fourth rotation path,
a second clutch selectively connecting the input shaft with the second rotation path,
a third clutch selectively connecting the input shaft with the eighth rotation path,
a fourth clutch selectively connecting the input shaft with the first rotation path,
a first brake selectively connecting the second rotation path with the transmission housing,
a second brake selectively connecting the first rotation path with the transmission housing, and
a third brake selectively connecting the sixth rotation path with the transmission housing.

7. The planetary gear train of claim 6,
wherein a first forward speed is achieved by operating the first clutch and the first and third brakes,
wherein a second forward speed is achieved by operating the first clutch and the second and third brakes,
wherein a third forward speed is achieved by operating the first and second clutches and the third brake,
wherein a fourth forward speed is achieved by operating the second clutch and the second and third brakes,
wherein a fifth forward speed is achieved by operating the second and third clutches and the third brake,
wherein a sixth forward speed is achieved by operating the second and third clutches and the second brake,
wherein a seventh forward speed is achieved by operating the first, second, and third clutches,
wherein an eighth forward speed is achieved by operating the first and third clutches and the second brake,
wherein a ninth forward speed is achieved by operating the first and third clutches and the first brake,
wherein a tenth forward speed is achieved by operating the third clutch and the first and second brakes,
wherein an eleventh forward speed is achieved by operating the third and fourth clutches and the first brake, and
wherein a reverse speed is achieved by operating the fourth clutch and the first and third brakes.

* * * * *